United States Patent
Wilson et al.

(10) Patent No.: US 9,265,082 B2
(45) Date of Patent: Feb. 16, 2016

(54) METHOD AND APPARATUS FOR PRIORITY BASED SESSION DELIVERY TO MULTIMODAL ENDPOINTS

(75) Inventors: Lee Joseph Wilson, Freehold, NJ (US); Jason Tanabe, Belleville (CA); Scott Hendrick, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 640 days.

(21) Appl. No.: 13/559,417

(22) Filed: Jul. 26, 2012

(65) Prior Publication Data

US 2014/0032740 A1 Jan. 30, 2014

(51) Int. Cl.
G06F 15/16 (2006.01)
H04W 76/02 (2009.01)
H04M 3/42 (2006.01)

(52) U.S. Cl.
CPC ........ *H04W 76/027* (2013.01); *H04M 3/42246* (2013.01)

(58) Field of Classification Search
CPC .................................................. H04L 63/0227
USPC ......................................... 709/206, 223, 224
See application file for complete search history.

(56) References Cited

U.S. PATENT DOCUMENTS

| | | | |
|---|---|---|---|
| 7,286,651 B1 | 10/2007 | Packingham et al. | |
| 7,916,651 B2 | 3/2011 | Pathak et al. | |
| 8,010,112 B1* | 8/2011 | Delker et al. .................. | 455/437 |
| 2003/0227939 A1* | 12/2003 | Yukie ...................... | H04L 12/64 370/465 |
| 2007/0117588 A1 | 5/2007 | Uehara et al. | |
| 2007/0286162 A1 | 12/2007 | Fabbrizio et al. | |
| 2009/0161629 A1 | 6/2009 | Purkayastha et al. | |
| 2009/0238194 A1* | 9/2009 | Basart ..................... | H04L 12/66 370/401 |
| 2012/0155445 A1* | 6/2012 | Javaregowda et al. ........ | 370/338 |
| 2013/0067099 A1* | 3/2013 | Ravindranath et al. ....... | 709/227 |

FOREIGN PATENT DOCUMENTS

| KR | 10-2006-0061480 | 6/2006 |
|---|---|---|
| KR | 10-2008-0035817 | 4/2008 |

(Continued)

OTHER PUBLICATIONS

"VOIP and IP Telephony: Planning for Convergence in State Government"—NASCIO, May 2005 http://www.nascio.org/publications/documents/NASCIO-VOIP.pdf.*
Notice of Allowance with English Translation for Korea Patent Application No. 10-2013-0075134, dated Aug. 26, 2014 3 pages.

(Continued)

*Primary Examiner* — Randy Scott
(74) *Attorney, Agent, or Firm* — Sheridan Ross P.C.

(57) ABSTRACT

Systems and methods for presenting a single invitation to join a communication directed to a multimodal endpoint are provided. More particularly, a communication directed to a multimodal endpoint is delivered to the multimodal endpoint using only a single communication network at a time. A communication server handling an incoming communication directed to the multimodal endpoint first attempts to initiate a communication session using a first, preferred communication network. If the communication is completed or is responded to by the multimodal endpoint using the first network, an attempt to complete the communication using a second network is not initiated. Alternatively, if the first communication network is not available to deliver the communication to the multimodal endpoint, an attempt to complete the communication using the second communication network is initiated.

19 Claims, 4 Drawing Sheets

(56) References Cited

FOREIGN PATENT DOCUMENTS

| | | |
|---|---|---|
| KR | 100893059 | 4/2009 |
| KR | 10-2011-0033470 | 3/2011 |

OTHER PUBLICATIONS

Official Action with English Translation for Korea Patent Application No. 2013-0075134, dated Apr. 23, 2014 12 pages.

\* cited by examiner

METHOD AND APPARATUS FOR PRIORITY BASED SESSION DELIVERY TO MULTIMODAL ENDPOINTS

FIELD

Methods and apparatuses for priority based session delivery to multimodal endpoints are provided. More particularly, a single mode of delivery is selected from multiple potential modes, in order to avoid sending simultaneous or nearly simultaneous communication session requests to a multimodal endpoint.

BACKGROUND

Multimodal endpoints are increasingly available. For example, many smart phones can support a number of network services. These can include, but are not limited to, cellular voice service, cellular data service, Wi-Fi, and Bluetooth. For incoming session requests, such as a voice call, although the device can be reachable by many technologies simultaneously, it is preferable to present one communication session request to the end user. However, in practice, the end user is typically presented with multiple communication session requests where multiple communication networks are available.

When there are different communication networks with different properties, calls may arrive at unpredictable times. If calls arrive at the same time, each incoming call can result in a "pop up" that appears at nearly the same time. This can confuse the user, or prevent the ability of the user to easily distinguish between and answer the desired incoming call attempt. In addition, users typically have a difficult time arbitrating between many incoming requests that actually represent the same call. If the delays are larger, it may be difficult for users to associate the different notifications together as alternative notifications for the same call. In addition, the behavior of the multimodal device may only allow a single incoming call at any one time. Therefore, if a call is answered, a later call may be rejected automatically due to resource contention on the target multimodal device. Accordingly, it would be desirable to provide a solution that presented a single communication session to a device with multimodal capabilities.

SUMMARY

Systems and methods for priority based session delivery to multimodal endpoints are provided. More particularly, server side logic operates to present a single call to a device with multimodal capabilities. Generally, the logic operates to determine whether a first or preferred communication network is available. If a determination is made that the first communication network is not available, then the logic attempts to use a second communication network to complete the communication session. As a result, only one communication network is operative to deliver any one communication session to a multimodal endpoint.

Systems in accordance with the present disclosure include a communication server or set of communication servers, and at least one multimodal endpoint. The communication server includes facilities supporting communications with multimodal endpoints using different communication networks. For example, the communication server can support session initiation protocol (SIP) calls delivered to the multimodal endpoint using a first communication network that includes an Internet protocol (IP) network. In addition, the communication server can support switched circuit or telephone system calls delivered to the multimodal endpoint using a second communication network that includes the public switched telephony network (PSTN) and/or a cellular telephony network.

Methods in accordance with embodiments of the present disclosure include receiving an incoming communication at the communication server for delivery to a multimodal endpoint. The communication server implements logic, for example through the execution of a priority based session delivery application, to select a communication network or mode for connecting the incoming communication to the multimodal endpoint. More particularly, the method includes initiating a communication session over a first, preferred network. If the communication session over the first network results in a response that accepts the communication session being received from the multimodal endpoint, the incoming communication is delivered to the multimodal endpoint using the first network. Alternatively, if the communication session initiated over the first network is rejected by the system as unregistered or as otherwise unavailable, or is not responded to by the multimodal endpoint within a predetermined period of time, a communication session is initiated over the second network. Accordingly, a communication session for the incoming communication is initiated over either the first network or over the first and second networks sequentially, but not over both networks simultaneously.

Additional features and advantages of embodiments of the present disclosure will become more readily apparent from the following discussion, particularly when taken together with the accompanying drawings.

DETAILED DESCRIPTION

Figure 1:
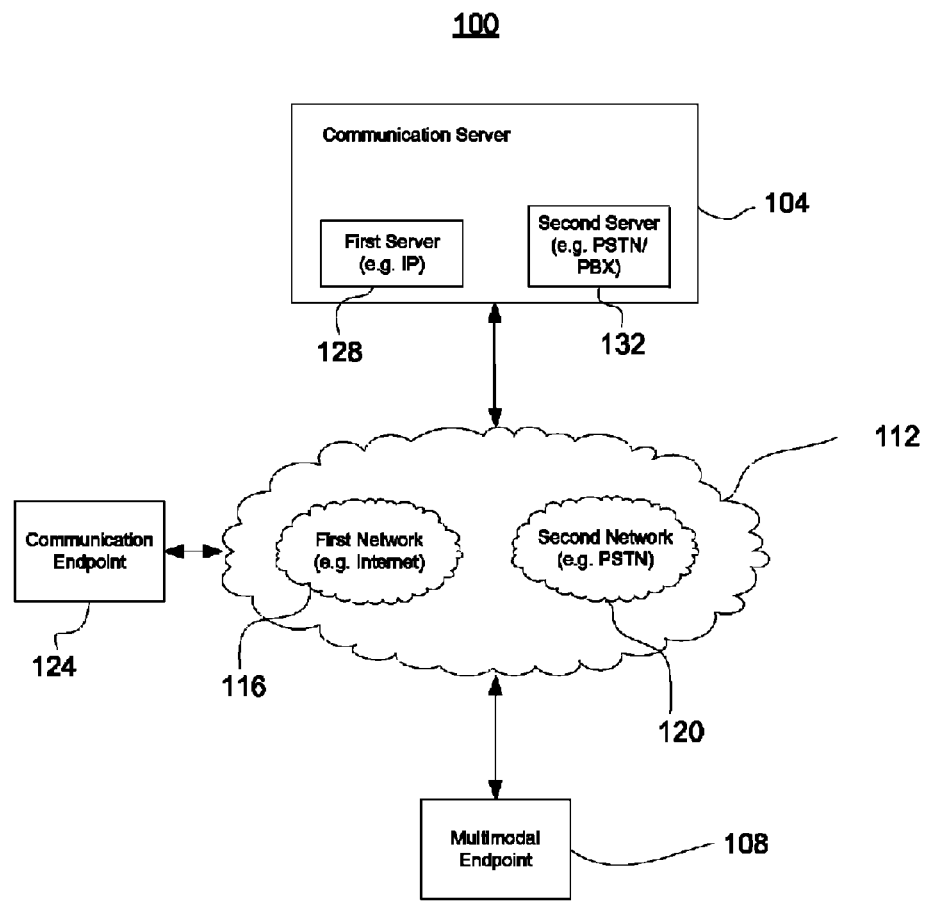
FIG. 1 illustrates components of a communication system in accordance with embodiments of the present disclosure.

FIG. 1 depicts a communication system 100 in accordance with embodiments of the present disclosure. In general, the system 100 includes a communication server 104 interconnected to one or more multimodal endpoints 108 via a plurality of communication networks 112. The communication networks 112 can include at least a first communication network 116, and a second communication network 120. The first communication network 116 may include one or a collection of networks that generally comprise the Internet. The second communication network 120 may include one or a collection of networks that generally comprise the PSTN and/or a cellular telephony network. The system 100 also generally includes one or more communication endpoints 124.

The communication server system 104 can include one or more communication or feature servers operable to support communications with a multimodal endpoint 108 over different communication networks 112. For example, a communication server system 104 can include a first communication server 128 operable to support communication sessions established over the first or Internet protocol (IP) network 116. As a further example, the communication server system 100 can include a second communication server 132 operable to support communications over the second or public switched telephony network (PSTN) 120. As examples, but without limitation, the first communication server 128 may comprise the Avaya AURA® Session Manager platform while the second server 132 may comprise the Avaya AURA® Communication Manager platform.

The multimodal endpoint 108 comprises a device capable of supporting communications over the first 116 and second 120 networks. As an example, but without limitation, a multimodal endpoint 108 may comprise a smart phone with a communication interface or network adapter for connecting to an IP network 116, such as through a Wi-Fi hotspot, and a cellular telephony communication interface or network adapter for supporting communications over the PSTN and/or a cellular telephony network 120. The multimodal endpoint 108 also generally includes application programming supporting communications over the first 116 and second 120 networks.

A communication endpoint 124 may comprise any communication device that initiates a request for a communication session with a multimodal endpoint 108 interconnected to the system 100. Accordingly, examples of a communication device 124 include a desktop telephone, a second multimodal device 108, a cellular telephone, a soft phone, an automated dialer, or other device capable of supporting communications that can be transmitted to a multimodal endpoint 108 over either of the first 116 or second 120 communication networks.

Figure 2A:
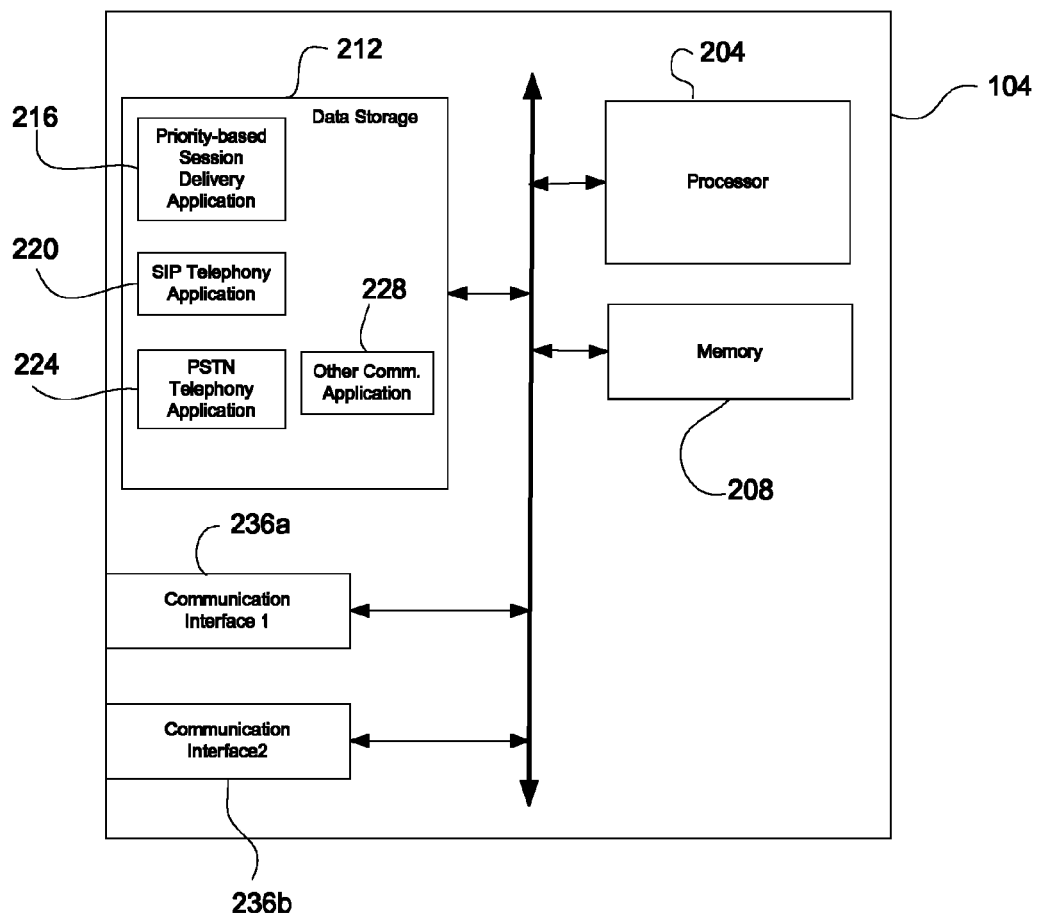
FIG. 2A depicts components of a communication server in accordance with embodiments of the present disclosure.

With reference now to FIG. 2A, components of a communication server 104 in accordance with embodiments of the present disclosure are depicted. In general, the communication server 104 includes a processor 204. The processor 204 may comprise a general purpose programmable processor or controller for executing application programming or instructions. As a further example, the processor 204 may comprise a specially configured application specific integrated circuit (ASIC) or other integrated circuit, a digital signal processor, a hard wired electronic or logic circuit such as a discrete element circuit, a programmable logic device or gate array, such as a PLD, PLA, FPDA, PAL, special purpose computer, or the like. The processor 204 generally functions to run programming code or instructions, for example in the form of applications, implementing various functions of the communication server 104. Although shown as a single processor 204, the processor 204 may be distributed across multiple devices. Moreover, different processors 204 can be dedicated to different functions, such as where the communication server 104 is implemented as first 128 and second 132 servers.

A communication server 104 can also include memory 208 for use in connection with the execution of application programming or instructions by the processor 204, and for the temporary or long term storage of program instructions and/or data. As an example, the memory 208 may comprise RAM, SDRAM, or other solid state memory. Alternatively or in addition, data storage 212 may be provided. In accordance with embodiments of the present invention, data storage 212 can contain programming code or instructions implementing various of the applications or functions executed by the communication server 104. Like the memory 208, the data storage 212 may comprise a solid state memory device or devices. Alternatively or in addition, the data storage 212 may comprise a hard disk drive or other random access memory.

In accordance with embodiments of the present invention, the data storage 212 can include various applications and data. For example, the data storage 212 can include a priority-based session delivery application 216. As a further example, the data storage 212 can include a session initiation protocol (SIP) telephony application 220, operable to support communications such as real time voice communications over a first, IP communication network 116. As a further example, the data storage 212 can include a PSTN telephony application 224, operable to support, for example, real time voice communications over the public switched telephony network and/or a cellular telephony network. As further examples, the data storage 212 can include other communication applications 228, such as instant messaging, email, or text messaging communication applications. As used herein, a communication application 228 can include a web-based application and an associated user account, for example a social network account, that together operate to support communications with the multimodal endpoint 108. As yet another example, the data storage 212 can include other user applications 232, such as calendar applications, browser applications, or any other applications suitable for execution by the multimodal endpoint 108.

A communication server can additionally include two or more communication interfaces 236. In general, a first one of the communication interfaces 236a is adapted to operably interconnect the multimodal endpoint 108 to the first communication network 116. The second communication interface 236b is generally adapted to operably interconnect the multimodal endpoint 108 to the second communication network 120. Accordingly, as examples, but without limitation, the first communication interface 236a may comprise an Ethernet or other IP network interface, while the second communication interface 236b may comprise an interface to the PSTN and/or to a cellular telephony network.

Figure 2B:
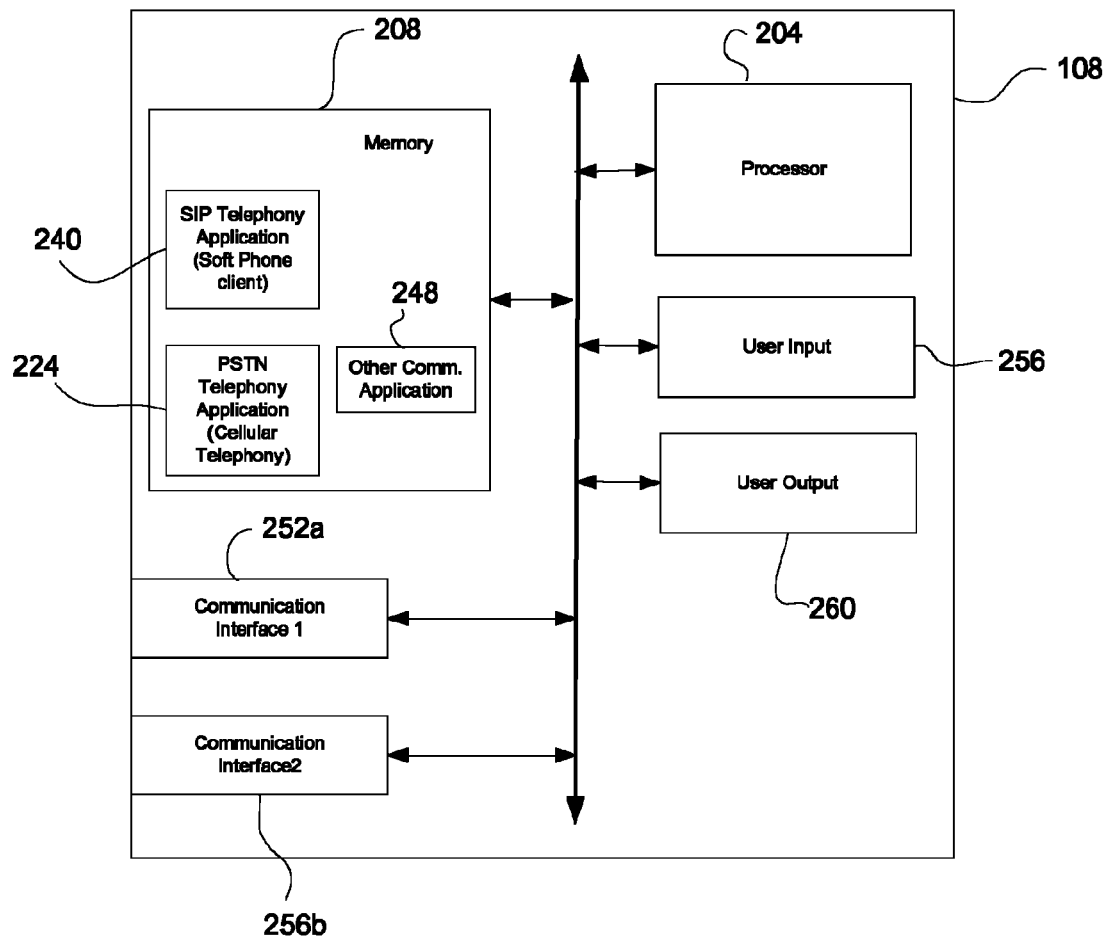
FIG. 2B depicts components of a multimodal endpoint in accordance with embodiments of the present disclosure.

FIG. 2B depicts components of a multimodal endpoint 108 in accordance with embodiments of the present disclosure. Like a communication server 104, the multimodal endpoint 108 generally includes a processor 204 and memory 208. As depicted in the figure, the memory 208 of the multimodal endpoint 108 is used for storing application programming or instructions. Alternatively or in addition, the multimodal endpoint 108 can include data storage. The application programming or instructions can include a soft phone client application 240 and a cellular telephony application 244. In addition, other endpoint communication applications 248 can be included, such as text messaging, email, instant messaging, or other communication facilities. A communication application 248 can also include a browser application and an associated user account, for example a social network account, that together can support communications with the user of the multimodal endpoint 108. The multimodal endpoint 108 can additionally include a first mobile communication interface 252a and a second mobile communication interface 252b. As examples, but without limitation, the first mobile communication interface 252a may comprise a wireless Ethernet or Wi-Fi interface in accordance with various IEEE 802.11 standards, while the second mobile communication interface 252b may comprise a cellular telephony transceiver. In addition, the multimodal endpoint 108 can include a user input 256 and a user output 260. As examples, the user input 256 may comprise a keypad, touch screen, microphone, or other input device, such as may be provided in connection with a smart phone or other mobile communication endpoint. Examples of a user output 260 include a display screen, speaker, vibrator, or other output device such as may be included in a smart phone or other mobile communication endpoint.

Figure 3:
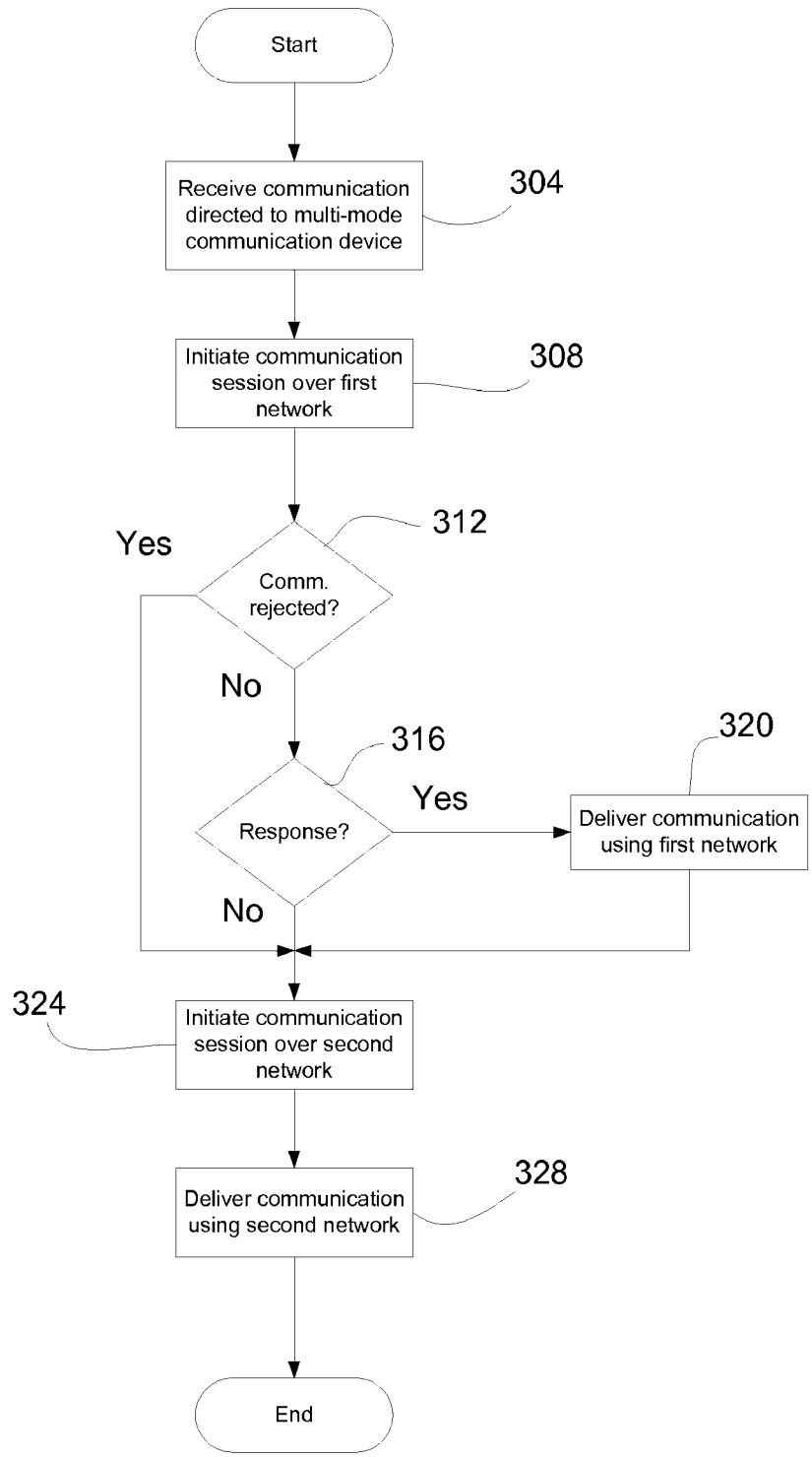
FIG. 3 is a flowchart depicting aspects of a method in accordance with embodiments of the present disclosure.

FIG. 3 is a flowchart illustrating aspects of the operation of a system 100 in accordance with embodiments of the disclosed invention. Initially, a communication directed to a multimodal endpoint 108 is received at the communication server 104. In general, the communication is initiated by a communication device 124. As can be appreciated by one of skill in the art after consideration of the present disclosure, the communication can also be initiated by the communication server 104, an automated display system, or the like. As an example, but without limitation, the communication can comprise a voice telephony call.

In response to receiving the communication, the communication server 104 initiates a communication session with the multimodal endpoint 108 over the first communication network 116 (step 308). More particularly, the communication server 104, through execution of the priority-based session delivering application 216, initiates a communication session over the preferred network. In accordance with embodiments of the present disclosure, the preferred communication network may comprise the first, IP network 116. In accordance with at least some embodiments of the present disclosure, every communication or call received from a communication endpoint 124 directed to a multimodal endpoint 108 is received at the communication server 104. In addition, attempts by the communication server 104 to connect the communication to the multimodal endpoint 108 are serialized, such that the communication server 104 first attempts to connect the communication using the first network 116.

At step 312, a determination is made as to whether the communication session that was initiated using the first network 116 has been rejected. If the communication session has not been rejected, a determination can next be made as to whether a response to the initiation of the communication session has been received (step 316). As can be appreciated by one of skill in the art, a rejection of a communication initiated over the first communication network 116 can include a signal indicating that the multimodal endpoint 108 is not registered with the first communication network 116, a signal indicating that the multimodal endpoint 108 is not connected to the first communication network 116, or a signal indicating that the multimodal endpoint 108 is otherwise not available using the first communication network 116. As can also be appreciated by one of skill in the art, a communication session is not rejected if a response to the invitation indicating that the multimodal endpoint 108 is "ringing" is received by the communication server 104. If a response accepting the communication session that was initiated over the first network 116 has been received, the communication is delivered to the multimodal endpoint 108 using the first communication network 116 (step 320). As can be appreciated by one of skill in the art after consideration of the present disclosure, the delivery of the communications to the multimodal endpoint 108 can result in the user output device 260 presenting an alert of the incoming call, for example as an audible ring, a visual notification and/or a vibration.

If the communication initiated over the first network 116 was rejected at step 312, or if it is determined at step 320 that a response to the initiation of the communication session has not been received by the communication server 104 within a predetermined period of time, a communication session is initiated over the second communication network 120 (step 324). As an example, the communication session initiated over the second communication network 120 may comprise a cellular telephony call. The communication can then be delivered to the multimodal endpoint 108 using the second communication network 120 (step 328). Accordingly, a communication session invitation sent to the multimodal endpoint 108 over the second communication network 120 is delayed at least until a determination is made that the first communication network 116 is unavailable. In addition, a communication session invitation with respect to a particular communication will not be sent using the second network 120 where a determination is made that the first communication network 116 is available. Therefore, a communication session invitation is always sent using the first communication network 116, but a communication session invitation is only sent using the second communication network 120 when the first communication network 116 is determined to be unavailable.

After delivering a communication using the first communication network 116 or the second communication network 120, the process can end, and the communication can then be handled conventionally. For example, the user of the multimodal endpoint 108 can answer the call, or reject the call. As can be appreciated by one of skill in the art after consideration of the present disclosure, embodiments of the disclosed invention first determine whether the first, preferred communication network 116 is available to support communications between the communication endpoint 112 initiating the communication and the multimodal endpoint 108 that is the target endpoint of the communication. Only if a determination is made that the first communication network 116 is not available to support the communication session is a communication session initiated using the second communication network 120. Accordingly, only one invitation or request to respond to a single communication session is delivered to a multimodal endpoint 108. As a result, a user of the multimodal endpoint 108 is not presented with potentially confusing, multiple requests to join a single communication at or about the same time.

In accordance with still other embodiments, a preferred communication network 116 and the alternate, second communication network 120, can both be of the same type. For example, both the first 116 and second 120 communication networks may comprise the Internet. However, the first communication network 116 can include a particular application or account, such as a user's social network account or page, while the second communication network 120 can include a soft phone, text message, email, or other communication application. In accordance with still other embodiments, more than two communication networks can be available. Where more than two communication networks can potentially be used, they may be accessed according to a predetermined hierarchy. For instance, continuing the above example, an attempt to deliver a communication using a first network 116 that includes an Internet protocol network and a first application can be followed by an attempt to deliver the communication using a second network 120 that includes the Internet and a second application. If these first and second attempts are both unsuccessful, a third attempt to deliver the communication using a network comprising the PSTN can be made.

Regardless of the network 116 or 120 used to deliver an invitation to join a communication session, where the user of a multimodal endpoint 108 does not accept the invitation to join, or enters an input declining to answer the communication, that communication can be sent to coverage normally. For example, the communication can be sent to voicemail, to an alternate communication device, or the like. Therefore, the process described herein is transparent to a calling communication endpoint 124.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described herein-above are further intended to explain the best network presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:

1. A method for session delivery to a multimodal endpoint, comprising:
    registering a multimodal endpoint with a communication server, wherein a communication to the multimodal endpoint can be completed using at least a first communication network or a second communication network;
    receiving a first communication directed to the multimodal endpoint at the communication server;
    determining whether the first communication network is available and further comprising a delay sufficient to allow the determination that the first network is unavailable; and
    one of:
        a) in response to determining that the first communication network is available, delivering the communication to the multimodal endpoint using the first communication network; or
        b) in response to determining that the first communication network is not available, delivering the communication to the multimodal endpoint using the second communication network; and
    wherein the first communication network utilizes a first communication network that includes an Internet protocol network, and wherein the second communication network utilizes a second communication network that includes the public switched telephony network.

2. The method of claim 1, wherein a determination is made that the first communication network is available, and wherein the first communication network is used to deliver the communication to the multimodal endpoint.

3. The method of claim 1, wherein a determination is made that the first communication network is not available, and wherein the second communication network is used to deliver the communication to the multimodal endpoint.

4. The method of claim 1, wherein a second communication directed to the multimodal endpoint is received at the communication server after the determination is made that the first communication network is not available, wherein the second communication is delivered to the multimodal endpoint using the second communication network.

5. The method of claim 1, wherein determining whether the first communication network is available includes:
    initiating a first communication session with the multimodal endpoint using the first communication network; and
    determining whether a response from the multimodal endpoint is received by the communication server using the first communication network.

6. The method of claim 5, wherein the communication server includes a first server operable to support communications using the first communication network, and a second server operable to launch communications using the second communication network.

7. The method of claim 6, wherein the second server receives the communication directed to the multimodal endpoint, wherein the communication is provided to the first server to initiate the first communication session, and wherein the second server initiates a second communication session after the determination as to whether a response from the multimodal endpoint is received using the first communication network has been made.

8. The method of claim 5, wherein a determination is made that a response from the multimodal endpoint has not been received using the first communication network after a message is received indicating that the multimodal device is not able to utilize the first communication network, or after at least a first predetermined period of time has elapsed without receiving a response from the multimodal endpoint using the first communication network.

9. The method of claim 1, wherein the first communication network is one of an Internet protocol network and a public switched telephony network and the second communication network is the other of the Internet protocol network and the public switched telephony network.

10. A communication system, comprising:
    a communication server, including:
        memory;
        at least a first processor;
        a first communication interface;
        a second communication interface;
        application programming stored in the memory and executed by the at least a first processor, wherein in response to a communication directed to a multimodal endpoint served by the communication server the application programming is operable to:
            test for availability of a link to the multimodal endpoint using the first communication interface and further comprising a delay sufficient to allow the determination that the link to the multimodal endpoint using the first communication interface is unavailable;
            in response to determining that the link to the multimodal endpoint using the first communication interface is available, direct the communication to the multimodal endpoint using the first communication interface;
            in response to determining that the link to the multimodal endpoint using the first communication interface is not available, direct the communication to the multimodal endpoint using the second communication interface; and
    wherein the first communication network utilizes a first communication network that includes an Internet protocol network, and wherein the second communication network utilizes a second communication network that includes the public switched telephony network.

11. The system of claim 10, wherein the communication server includes:
    a first server, wherein the first communication interface is associated with the first server;
    a second server, wherein the second communication interface is associated with the second server.

12. The system of claim 11, wherein the second server receives the communication directed to the multimodal endpoint, and wherein the second server notifies the first server of the communication, and wherein the first server determines whether the link to the multimodal endpoint using the first communication interface is available.

13. The system of claim 12, wherein the first server is interconnected to an Internet protocol network by the first communication interface, and wherein the second server is interconnected to the public switched telephony network by the second communication interface.

14. The system of claim 13, further comprising:
the multimodal endpoint, wherein the multimodal endpoint includes a first network adapter interconnected to the Internet protocol network and a second network adapter interconnected to the public switched telephony network.

15. A non-transitory computer readable medium having stored thereon computer executable instructions, the computer executable instructions causing a processor to execute a method for communication session delivery to a multimodal endpoint, the computer readable instructions comprising:
instructions to determine whether a first communication network is available to deliver an invitation to join a first communication session to the multimodal endpoint and further comprising a delay sufficient to allow the determination that the first network is unavailable;
instructions to deliver the communication session invitation to the multimodal endpoint using a second communication network in response to determining that the first network is unavailable, wherein the communication session is not delivered to the multimodal endpoint using the second communication network following a determination that the first communication network is available; and
wherein the first communication network utilizes a first communication network that includes an Internet protocol network, and wherein the second communication network utilizes a second communication network that includes the public switched telephony network.

16. The non-transitory computer readable medium of claim 15, wherein the first communication network is determined to be unavailable if the multimodal endpoint is not registered for communications over the first communication network.

17. The non-transitory computer readable medium of claim 16, further comprising:
instructions to deliver the communication session invitation to the multimodal endpoint using the first communication network in response to determining that the first communication network is available, wherein the first communication network is determined to be unavailable if no response to the communication session invitation delivered to the multimodal endpoint using the first communication network is received.

18. The non-transitory computer readable medium of claim 17, further comprising instructions to make no attempt to deliver the communication session invitation to using the second communication network in response to determining that the first communication network is available.

19. The non-transitory computer readable medium of claim 18, further comprising instructions to send the communication session to coverage in response to receiving a rejection of the communication session invitation.

* * * * *